United States Patent
Hofmann et al.

(10) Patent No.: US 6,322,049 B1
(45) Date of Patent: Nov. 27, 2001

(54) MAGNET-ACTUATED SEAT VALVE HYDRAULIC BRAKE SYSTEMS OF MOTOR VEHICLES

(75) Inventors: Dirk Hofmann, Ludwigsburg; Guenther Hohl, Stuttgart; Massimo Ambrosi, Marbach; Christian Laier, Heidelberg, all of (DE)

(73) Assignee: Robert Rosch GmbH, Stuttgart (DE)

( * ) Notice: Subject to any disclaimer, the term of this patent is extended or adjusted under 35 U.S.C. 154(b) by 0 days.

(21) Appl. No.: 09/600,915

(22) PCT Filed: Nov. 20, 1998

(86) PCT No.: PCT/DE98/03436

§ 371 Date: Aug. 25, 2000

§ 102(e) Date: Aug. 25, 2000

(87) PCT Pub. No.: WO99/37517

PCT Pub. Date: Jul. 29, 1999

(30) Foreign Application Priority Data

Jan. 23, 1998 (DE) .............................. 198 02 464

(51) Int. Cl.$^7$ .............. B60T 8/36; F16K 1/44; F16K 31/06
(52) U.S. Cl. ............... 251/129.15; 251/333; 303/119.2
(58) Field of Search .............. 251/129.15, 333, 251/359; 303/119.2

(56) References Cited

U.S. PATENT DOCUMENTS

| | | | |
|---|---|---|---|
| 5,603,483 | * 2/1997 | Reuter et al. | 251/129.15 X |
| 5,673,980 | * 10/1997 | Schwarz et al. | 303/119.2 |
| 5,836,334 | * 11/1998 | Mittwollen et al. | 303/119.2 X |
| 5,887,956 | * 3/1999 | Rausch | 303/119.2 |
| 6,113,066 | * 9/2000 | Hohl et al. | 251/129.15 X |
| 6,152,420 | * 11/2000 | Hohl | 303/119.2 X |
| 6,189,983 | * 2/2001 | Volz et al. | 303/119.2 |
| 6,224,170 | * 5/2001 | Hosoya | 303/119.2 |

* cited by examiner

Primary Examiner—Kevin Shaver
Assistant Examiner—Eric Keasel
(74) Attorney, Agent, or Firm—Ronald E. Greigg

(57) ABSTRACT

A tubular valve housing includes a guide body for pressure fluid that is disposed between a valve body having a hollow-conical valve seat and a chamber of the valve housing, in which actuating means of the valve are received in the chamber. The guide body is penetrated by a closing body of the valve which divides the chamber from an annular conduit. The annular conduit carries the pressure fluid and communicates with the valve seat and has circumferential outlet openings of the valve housing. The guide body is braced on the valve body, with a face end contacting the valve body, and has guide conduits, fitting over an outline of the valve seat, which on the outlet side discharge into the annular conduit. The face end of the closing body, which cooperates with the valve seat, is a spherical portion that makes a transition with sharp edges to the cylindrical shaft of the closing body. With the guide body, the stream of pressure fluid emerging from the valve seat is diverted into the annular conduit, so that flow instabilities are largely without any effect on the chamber of the valve. The valve can be used in brake systems of motor vehicles.

6 Claims, 2 Drawing Sheets

MAGNET-ACTUATED SEAT VALVE HYDRAULIC BRAKE SYSTEMS OF MOTOR VEHICLES

PRIOR ART

The invention is based on a hydraulic, magnet-actuated valve for hydraulic brake systems of motor vehicles.

From German Patent Disclosure DE 40 31 885 A, which defines this generic type, a magnet-actuated hydraulic valve is known that has a hollow-conical valve seat of a seat valve, to which a closing body with a cylindrical shaft and a conical face end, whose conicity differs from that of the valve seat, is assigned. In the valve housing of this valve, with axial spacing from the valve seat, a guide body for pressure fluid is secured. The guide body is penetrated by the shaft of the closing body. Between the valve seat and the opposed end face of the guide body, there is an annular chamber for receiving pressure fluid that has emerged from the seat valve in the form of a hollow-closing body and, through the closing body shaft, on the actuating means of the valve.

A valve is also known (DE 41 29 638 A) in which a hollow-cylindrical guide body is press-fitted into the valve housing with spacing from the valve body. The guide body has a sleeve-like extension, oriented toward the valve body, with which a ball, secured to a valve tappet on the face end, and acting as a closing body of a seat valve is grasped approximately as far as the great circle. The extension of the guide body that is bounded in bladelike fashion toward the valve seat, changes over with a concave jacket face to the inside circumference of the valve housing, and with the valve body it defines a relatively large valve chamber of the valve housing, from which two diametrically located outflow bores of the valve housing originate. In this known embodiment, the purpose of the guide body is to divert pressure fluid that when the seat valve is open flows along the surface of the ball, and thus to prevent instabilities of the pressure fluid flow along the conical stream. Outlet openings of the valve housing originate on the circumference at the annular chamber, so that the pressure fluid undergoes a deflection. Through the shaft of the closing body, which is penetrated by a conduit, a chamber of the valve housing that contains actuating means of the valve communicates with the annular chamber when the seat valve is open and with a pressure fluid connection when the seat valve is closed. A disadvantage of this valve is that because of the deflection of the pressure fluid in the annular chamber near the valve seat, flow instabilities can develop, which can have a disruptive effect on the remains free of disruptive flow forces. The valve can therefore be controlled by known methods of electrical triggering with high precision, in infinitely graduated manner, into arbitrary reciprocation positions of its closing member.

A version of the guide body that guides the pressure fluid, after its outlet from the valve seat, in a favorable way or other words with little deflection is disclosed in hereinafter.

With the design of the guide body, shaping is disclosed that can be created advantageously from a production standpoint, for instance by injection molding.

The course of the guide conduits defined is favorable for the deflection of the pressure fluid flow from the hollow-conical stream to the annular conduit.

A unit comprising the guide body and the valve body is created in which the three-dimensional association of the two parts to one another is attained by a positive connection that is favorable from an assembly standpoint.

The refinement of the valve has an advantage that the valve housing, which fittingly grasps the spring tongues of the guide body, maintains the positive connection between the guide body and the valve body permanently.

BRIEF DESCRIPTION OF THE DRAWINGS

One exemplary embodiment of the invention is shown in simplified form in the drawings and described in further detail below.

DESCRIPTION OF THE EXEMPLARY EMBODIMENT

Figure 1:
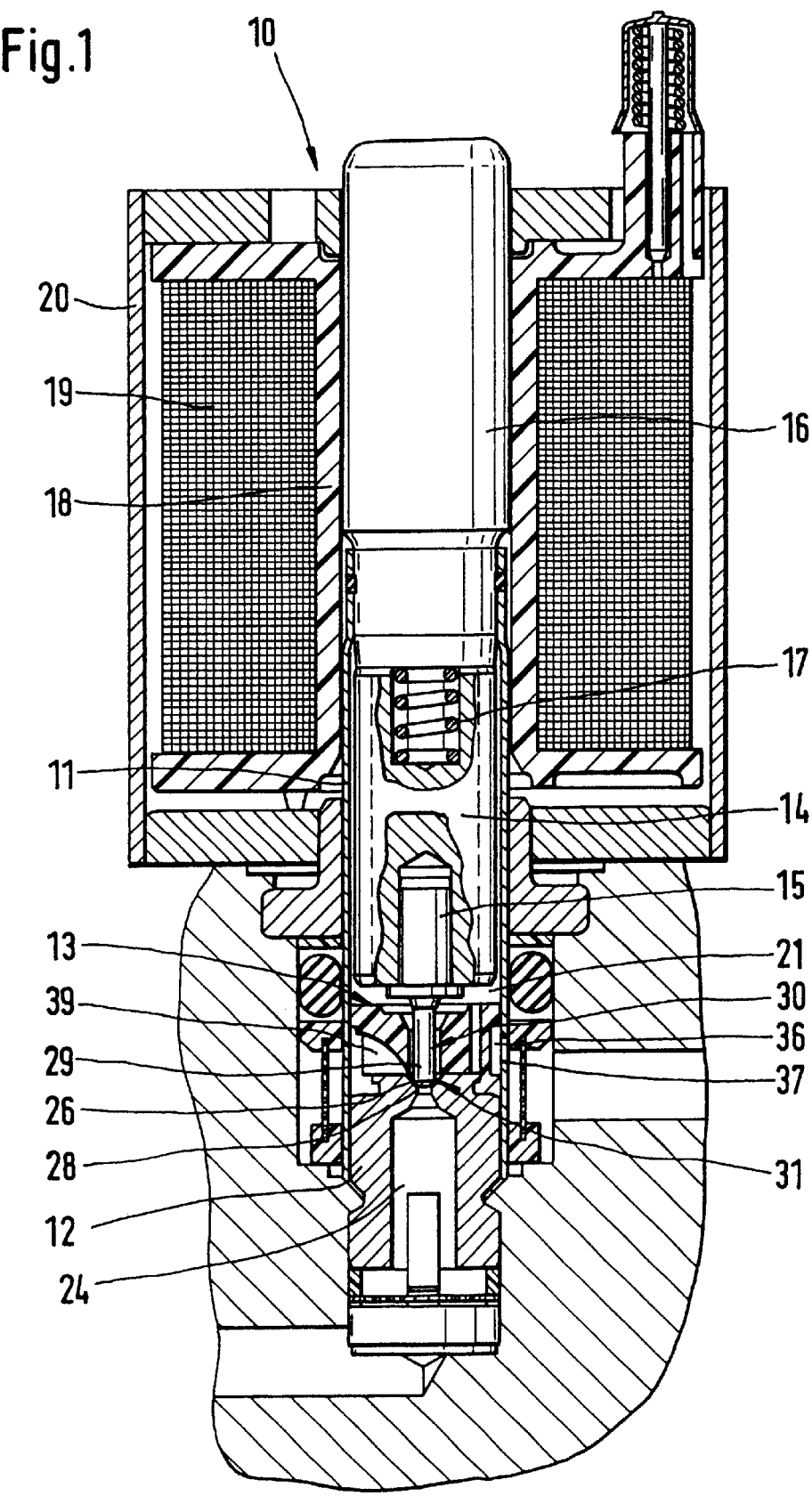
FIG. 1 is a longitudinal section through a hydraulic, magnet-actuated valve with a guide body for pressure fluid emerging from a valve seat.

A hydraulic, magnet-actuated valve designated 10 in FIG. 1 and hereinafter called a magnet valve has essentially the following components in coaxial arrangement: a thin-walled, tubular valve housing 11 having an end portion of which a valve body 12 is disposed and secured in pressure-tight fashion in the valve housing. A guide body 13 for pressure fluid is received in the valve housing 11 and braced on a face end on the valve body 12. A magnet armature 14 is guided longitudinally movably in the valve housing 11 with a tappet 15 press-fitted into the armature on a side toward the guide body. A pole core 16 closes off the valve housing 11 on another end portion and is connected to the other end portion in pressure-tight fashion. A restoring spring 17 is disposed between the magnet armature 14 and the pole core 16. A coil 18 grasps the pole core 16 and the valve housing 11, with an electric winding 19; and a housing 20 that carries magnetic flux and surrounds the coil 18 and the winding 19. The magnet armature 14 and the restoring spring 17 are actuating means of the magnet valve 10 and are located in a chamber 21 of the valve housing 11 between the guide body 13 and the pole core 16.

Figure 2:
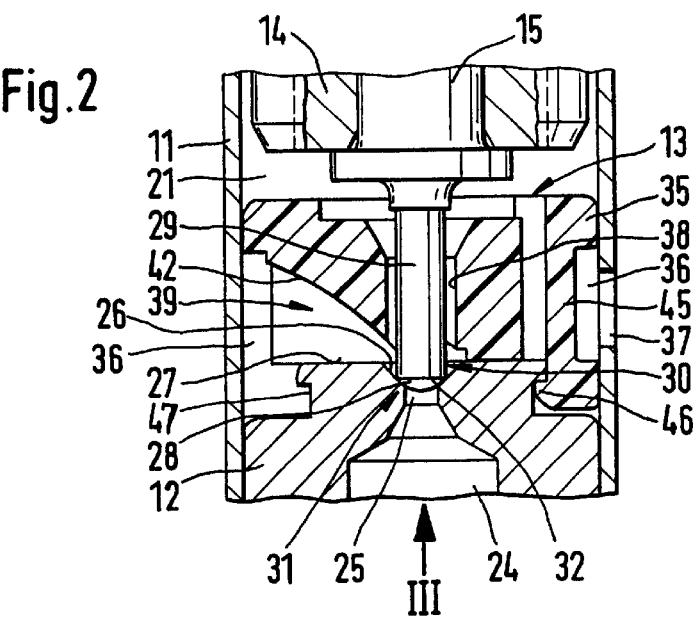
FIG. 2 is a section showing the region of the valve provided with the guide body, on a larger scale.

The valve body 12 has a coaxially extending inlet bore 24 for pressure fluid, which bore changes over into a smaller-diameter through bore 25 and then following that changes into a hollow-conical valve seat 26 (FIG. 2). On the orifice side toward the guide body, the valve seat 26 ends with sharp edges at an end face 27 that extends radially to the longitudinal axis of the valve body. Associated with the valve seat 26 is a spherical end face 28, on an end of a cylindrical shaft 29 that forms a closing body 30 which is integral with the tappet 15. The closing body 30 is braced with the spherical end face, on the valve seat 26 of the valve body 12 under the influence of a restoring spring 17. The closing body 30 and the valve seat 26 form a seat valve 31 of the magnet valve 10, which is closed when it the magnet value without current. The cylindrical shaft 29 of the closing body 30 has a diameter that is approximately in the middle between a small diameter, determined by the through bore 25, and the diameter at the orifice of the valve seat 26. The radius of the spherical end face 28 in turn is greater than half the diameter of the cylindrical shaft 29 of the closing body 30, so that the transition between the spherical end face and the cylindrical shaft takes place along a sharp edge 32. The dimensions of the spherical end face 28 and the cylindrical shaft 29 of the closing body 30 are adapted to one another in such a way that in the axial plane shown in FIG. 2, a tangent placed against the spherical end face in the region of the edge 32 approximately follows the opening angle of the valve seat 26. By supplying current to the electrical winding 19, the closing body 30 can be lifted from the valve seat 26. At a maximum opening stroke of the seat valve 31, the edge 32 on the closing body 30 does not emerge from the valve body 12 any farther than the orifice of the valve seat 26.

Figure 3:
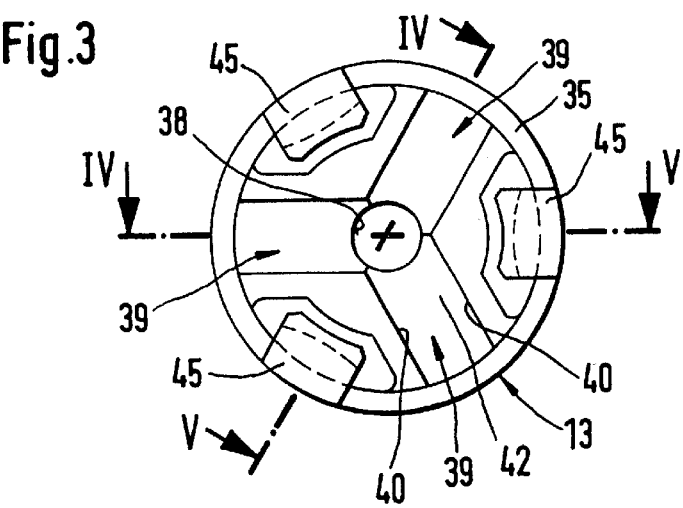
FIG. 3 shows a view of the guide body in the direction of the arrow III in FIG. 2.
Figure 4:
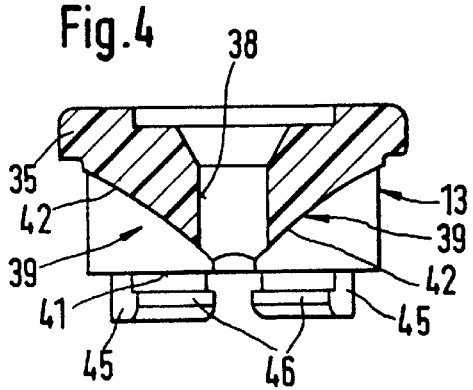
FIG. 4 is a section through the guide body taken along the lines IV—IV in FIG. 3.

The guide body 13 braced with a face end contacting the valve body 12 has an encompassing collar 35, protruding radially from a side toward the magnet armature, and with this collar the guide body is received, radially fittingly, in the valve housing 11 (FIG. 2). With its collar 35, the guide body 13 divides the chamber 21, containing the actuating means 14, 17 of the magnet valve 10, from an annular conduit 36 that is located between the collar, the valve body 12, and the valve housing 11. The annular conduit extends on the outer circumference of the guide body and communicates, carrying pressure fluid, with three outlet openings 37 of the valve housing, only one of which is visible in FIGS. 1 and 2. The guide body 13 also has a central through bore 38 for the closing body 30 of the seat valve 31. The guide body 13 furthermore has three substantially radially extending guide conduits 39, which intersect the through bore 38 toward the valve seat and are disposed with uniform distribution over the circumference of the guide body 13 and discharge into the annular conduit 36 (FIGS. 2, 3 and 4). The guide conduits 39 are defined with parallel walls by their side walls 40 and are embodied as slits that are open toward an end face 41, toward the valve body, of the guide body and toward the annular conduit 36; each of these slits extends symmetrically to axial planes of the guide body. The bottom 42 of the guide conduits 39 is slightly concave (FIG. 4), seen in longitudinal section of the guide body 13. The bottom 42 of the guide conduits 39 also extends at an angle to the longitudinal axis of the guide body that is equivalent to approximately half the cone angle of the valve seat 26 (FIG. 2). In addition, the bottom 42 of the guide conduits 39 is axially recessed, from the end face 41 toward the valve body of the guide body 13, far enough that an imaginary lengthening of the bottom 42 opens into the valve seat cross section. In other words, while the guide body 13 otherwise covers the valve body 12 on a face end, the three guide conduits 39 fit over the valve seat outline on the orifice side, specifically over the full circumference, because of the width of the guide conduits.

Figure 5:
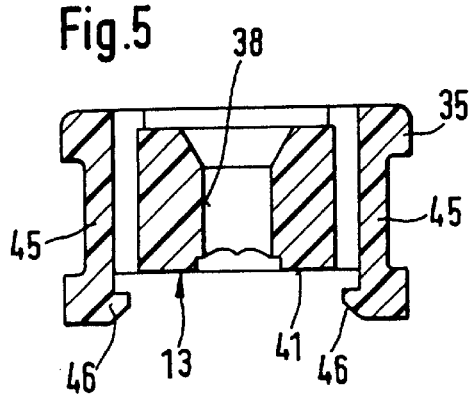
FIG. 5 is a section through the guide body taken along the lines V—V in FIG. 3.

On a circumference, the guide body 13 is provided with three axially extending spring tongues 45 (FIGS. 3 and 5), extending between the guide conduits 39. These tongues protrude past the end face 41, toward the valve body, of the guide body 13, and on their free end the torque have a radially inward-pointing protrusion 46. With this protrusion 46, the spring tongues 45 engage an encompassing groove 47 of the valve body 12 (FIG. 2). On the end, the spring tongues 45 are reinforced to correspond to the collar 35 of the guide body 13, so that their end portion toward the protrusion is received, radially fittingly, in the valve housing 11. The positive connection between the guide body 13 and the valve body 12 which is attained by means of the spring tongues 45, and which cannot be undone because of the grasp by the valve housing 11, makes a press fit of the guide body in the valve housing 11 unnecessary. The guide body 13 can advantageously be made as a plastic injection molded part.

The magnet valve 10, by being supplied with current, for instance by means of current ramp control or pulse width modulation of its electrical winding 19, can be controlled in infinitely graduated fashion into arbitrary intermediate positions between the closing position and the position of a maximum valve stroke of its seat valve 31. The pressure fluid, which is under pressure in the inlet bore 24 of the valve body 12, emerges from the valve seat 26 in the form of a hollow-conical stream when the seat valve 31 is open. The edge 32 promotes the undisrupted separation of the hollow-conical stream from the closing body 30. Upon emerging from the valve seat 26, the hollow-conical stream is engaged by the three guide conduits 39 and is carried to the annular conduit 36. There, a diversion of the pressure fluid flow to the outlet openings 37 takes place, and from these openings the pressure fluid flows out of the magnet valve 10. In the valve seat 26 and in the guide conduits 39, the pressure fluid flow is largely free of flow instabilities, while such instabilities do occur on the outlet side of the guide conduits 39. On the side toward the valve seat, because of the described flow diversion, the resultant pressure disruptions essentially do not affect the chamber 21 of the magnet valve 12 that contains the actuating means 14, 17; this chamber is filled with pressure fluid and communicates so as to carry pressure fluid with the valve seat 26 via the through bore 38 in the guide body 13. The pressure-balanced magnet armature 14 is thus subjected to hydraulic forces solely at the spherical portion 28 of its closing body 30. Thus the force of the restoring spring 17 acts in the closing direction on the magnet armature 14, while the hydraulic force on the closing body 30 and the magnetic force act on the magnet armature in the opening direction. As a result, the seat valve 31 can be controlled into stable intermediate positions.

In a departure from the exemplary embodiment, the disposition of the guide body 13 according to the invention can also be employed in a magnet valve 10 that is open when the magnet is without current. Instead of being provided with three guide conduits 39, the guide body 13 can also be provided with only two guide conduits or more than three guide conduits. The number of spring tongues 45 can also be different, or the fastening of the guide body 13 in the valve housing 11 can be accomplished in a different way from what it is described here.

The magnet valve 10 can be employed in brake systems of motor vehicle for instance with traction control, with driver-independent brake pressure control, and with brake-by-wire actuation.

The foregoing relates to a preferred exemplary of embodiments of the invention, it being understood that other variants and embodiments thereof are possible within the spirit and scope of the invention, the latter being defined by the appended claims.

What is claimed is:

1. An electromagnet actuated valve (10) for hydraulic brake systems of motor vehicles, comprising a tubular valve housing (11), a valve body (12) secured in one end of the valve housing, said valve body includes a hollow-conical valve seat (26) of a seat valve (31) embodied on a face end of the valve body (12), a closing body (30) having a cylindrical shaft (29) and guided longitudinally movably in the valve housing (11), the closing body includes an end face that makes a sharp-edged transition to the closing body shaft (29), and cooperates with the valve seat (26) of the seat valve (31), a guide body (13) is disposed in the valve housing (11) and braced with an end face that rests on the valve body (12), pressure fluid emerging from the valve seat (26) is received in an annular conduit (36) and supplied to at least one circumferential outlet opening (37) of the valve housing (11), and a central through bore (38) in the guide body (13) for a passage of the cylindrical shaft (29) through the closing body (30), the guide body (13) divides a chamber (21) of the valve housing (11) that contains actuating means (14, 17) of the valve (10) from the annular conduit (36), the face end of the closing body (30) is a spherical portion (28); the dimensions of the spherical portion (28) and the cylindrical shaft (29) of the closing body (30) are adapted to one another such that a tangent to the spherical portion (28), extending in an axial plane of the closing body shaft (29) in a region of a sharp edge (32) that extends at the transition between the spherical portion (28) and the cylindrical shaft (29), at least approximately follows a cone angle of the valve seat (26); the opening stroke of the seat valve (31) is limited to a maximum value at which the closing body edge (32) reaches the orifice of the valve seat (26); the guide body (13) has guide conduits (39) that fit over the valve seat outline on the orifice side, for pressure fluid, the conduits on the outlet side lead to the annular conduit (36) disposed on a circumference of the guide body (13), and the guide conduits (39) on the outlet side do not coincide with the at least one outlet opening (37); the bottom (42) of the guide conduits (39) extends at an angle to the longitudinal axis of the guide body or the longitudinal axis of the closing body that corresponds at least approximately to half the cone angle of the valve seat (26), and is recessed axially in the guide body (13) so far that the guide conduits (39) intersect the through bore (38) of the guide body (13) toward the valve seat, and an imaginary lengthening of the bottom (42) in the direction of the longitudinal axis of the through bore (38) or the longitudinal axis of the guide body discharges into the cross section of the valve seat; and the chamber (21) of the valve (10) containing the actuating means (14, 17) communicates hydraulically with the valve seat (26).

2. The valve of claim 1, in which the guide body (13) is provided with at least two guide conduits (39) disposed in uniform distribution.

3. The valve of claim 2, characterized in which the guide conduits (39) in the guide body (13) are embodied as open slits, defined laterally with parallel walls and open toward an end face (41) of the guide body (13) toward the valve body and toward the annular conduit (36), and each of the guide conduits extend symmetrically to axial planes of the guide body (13).

4. The valve of claim 2, in which the bottom (42) of the guide conduits (39) is concave in shape in a longitudinal section of the guide body (13).

5. The valve of claim 1, in which the guide body (13) has spring tongues (45), that extend circumferentially and axially between the guide conduits (39), and which protrude past the end face (41) of the guide body toward the valve body of the guide body and which with inward-pointing protrusions (46) engage an encompassing groove (47) of the valve body (12).

6. The valve of claim 5, in which the spring tongues (45) of the guide body (13) are received, in a radially fitting manner with their end portion toward the protrusion in the valve housing (11).

* * * * *